UNITED STATES PATENT OFFICE.

FREDERICK S. BARFF, OF KILBURN, COUNTY OF MIDDLESEX, ENGLAND.

PRESERVING COMPOUND.

SPECIFICATION forming part of Letters Patent No. 258,001, dated May 16, 1882.

Application filed March 21, 1882. (No specimens.) Patented in England March 25, 1881, No. 1,332.

*To all whom it may concern:*

Be it known that I, FREDERICK SETTLE BARFF, a subject of the Queen of Great Britain, and residing at Kilburn, in the county of Middlesex, England, have invented a new Compound to be employed in the Preservation of Organic Substances, (for which I have obtained a patent in Great Britain, No. 1,332, dated March 25, 1881,) of which the following is a specification.

My said invention relates to the preparation of a new material or chemical compound to be employed for the preservation of organic substances. For this purpose I take boracic acid and dissolve it in glycerine by the aid of heat, maintaining the temperature for about four or five hours, or until the desired combination is effected, care being taken, however, that the temperature employed shall not be so excessive as to decompose the glycerine, and I add to such solution or compound a further quantity of boracic acid from time to time until the boracic acid ceases to be dissolved. The compound resulting, when allowed to cool, is solid, and is what I have called "boroglyceride," which is a new chemical compound.

As an example of the manner in which my said invention may be effectively carried out, I proceed as follows: I heat glycerine to near its boiling-point and add boracic acid until it ceases to be dissolved, the proportions being about ninety-two parts, by weight, of glycerine to sixty-two parts, by weight, of boracic acid, (crystallized,) which is equivalent to three molecules of glycerine ($C_3H_8O_3$) to one of boric oxide, ($B_2O_3$.) I maintain the mixture at a temperature of about 200° centigrade as long as water is given off. When the mass cools it becomes a yellowish transparent glacial substance, tough and deliquescent. This dissolves in water; but when boiled in large quantities of the same it is decomposed into glycerine and boracic acid. This before-mentioned compound is also soluble in alcohol, and the solution has the property of preventing the putrefaction of organic substances. The composition of the glacial body, as determined by analysis, is nearly $C_3H_5BO_3$, or $H_3BO_3$, in which $H_3$ is replaced by the trivalent radical $BO_3$. By using the constituents in different proportions different (substitution) products are formed; but the one mentioned is that which I prefer to use.

In order to employ the compound of boracic acid and glycerine, I prepare a solution of the same, either in water, alcohol, or other suitable solvent, and I either immerse in or impregnate with such solutions the organic substances to be operated upon.

Solutions may be prepared of various degrees of strength; but I have found that a solution consisting of about one part, by weight, of the compound before referred to, and forty parts, by weight, of water will give good results; but other proportions may be adopted.

Solutions of the compound hereinbefore described may be applied to the preservation of all organic substances, either animal or vegetable.

Having now described and particularly ascertained the nature of my said invention, and the manner in which the same is or may be used or carried into effect, I would observe, in conclusion, that what I consider to be novel and original, and therefore claim as the invention secured to me, is—

As an agent for the preservation of organic matter, a compound of boracic acid and glycerine having the characteristics described.

In testimony whereof I have signed my name to this specification in the presence of two subscribing witnesses.

FRED. S. BARFF.

Witnesses:
CHAS. MILLS,
JOHN JAMES,
*Both of 47 Lincoln's Inn Fields, London.*